Sept. 21, 1965     G. A. WAVERING ETAL     3,206,905
SYSTEM FOR TREATING AND HANDLING PERLITE AND THE LIKE
Filed Sept. 18, 1961     3 Sheets-Sheet 1
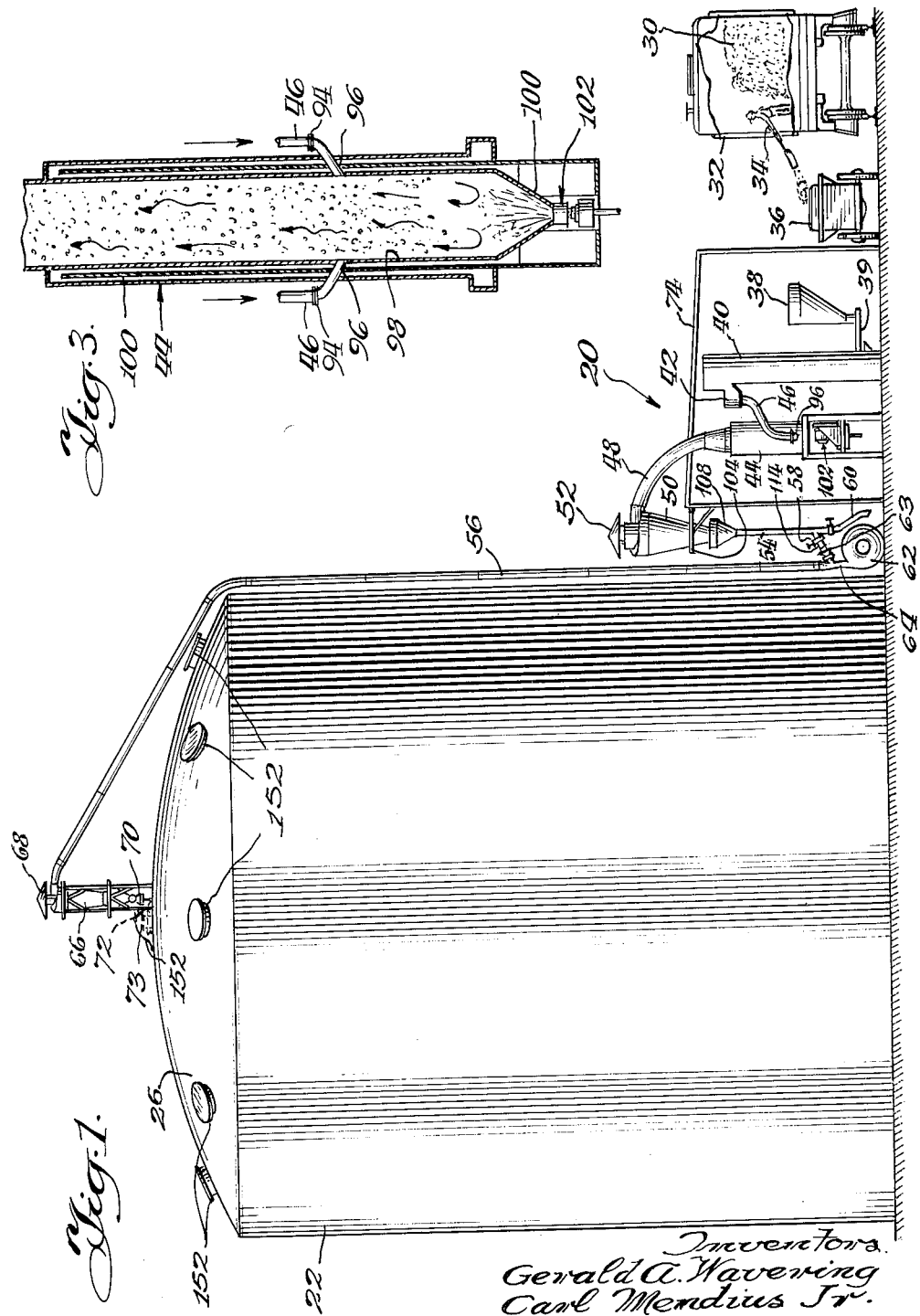
Inventors
Gerald A. Wavering
Carl Mendius Jr.
By Silverman, Mullin & Cass
Attorneys

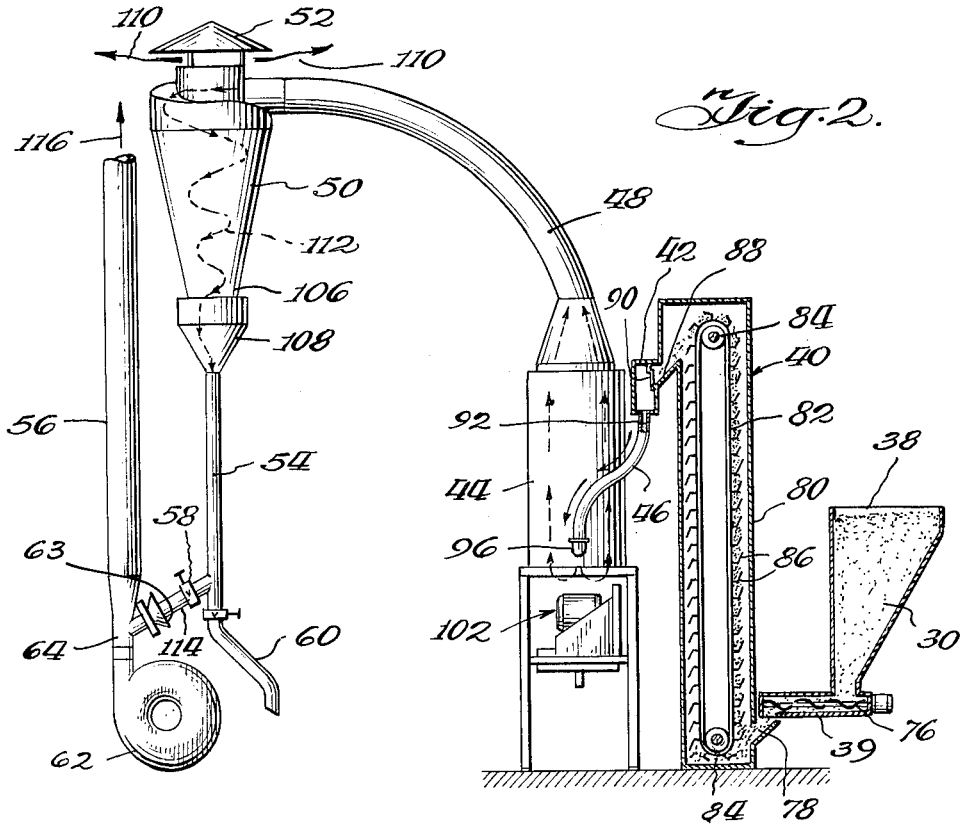
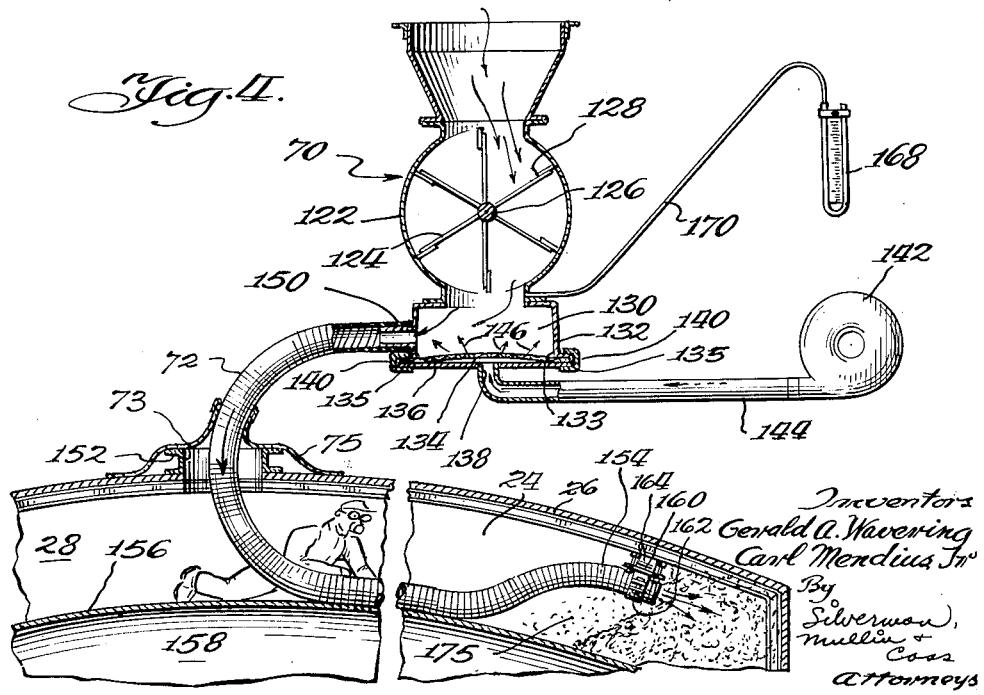

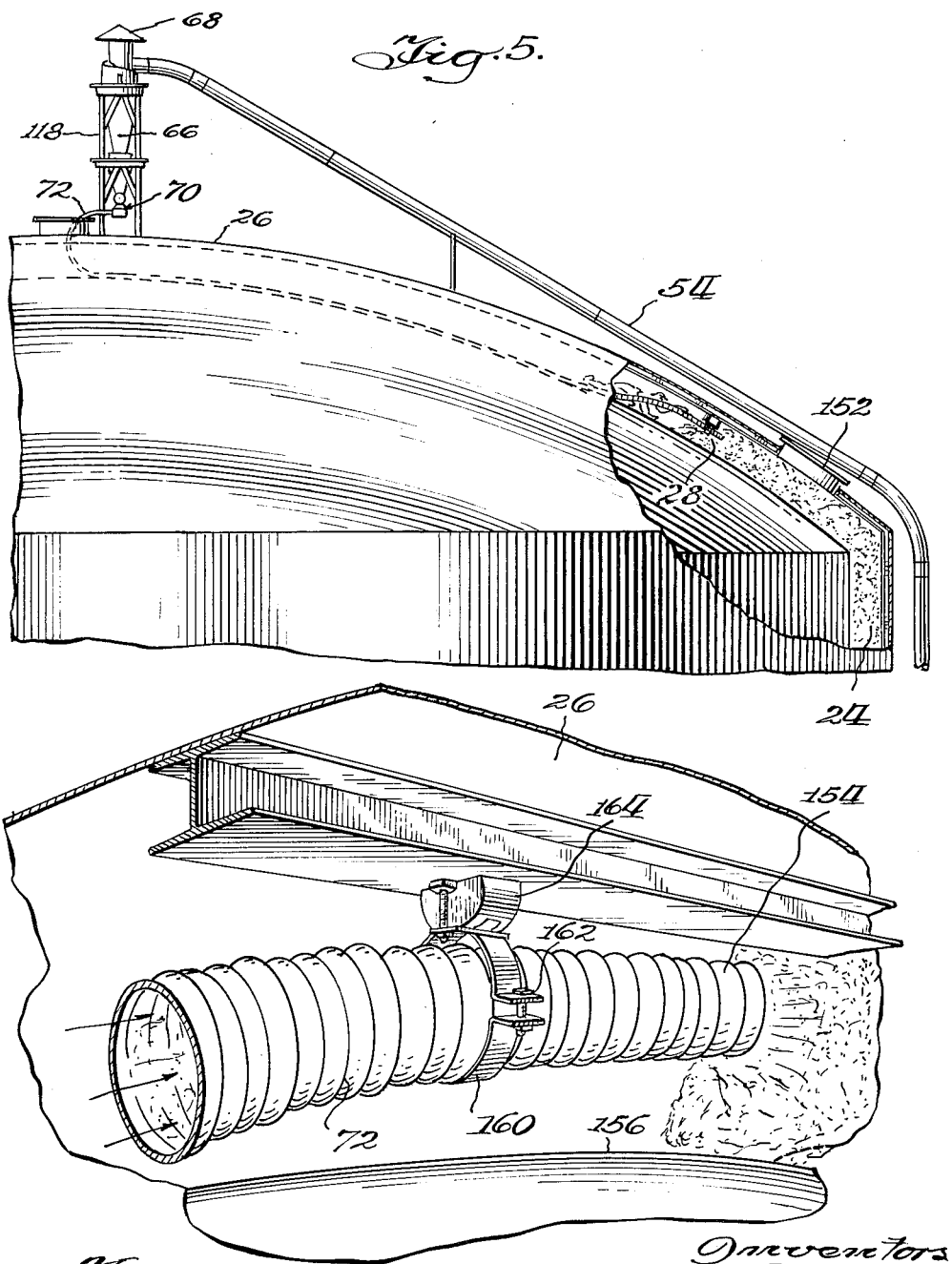

United States Patent Office 3,206,905
Patented Sept. 21, 1965

3,206,905
SYSTEM FOR TREATING AND HANDLING
PERLITE AND THE LIKE
Gerald A. Wavering, Oak Lawn, and Carl Mendius, Jr., Naperville, Ill., assignors to Silbrico Corporation, Chicago, Ill.
Filed Sept. 18, 1961, Ser. No. 138,788
23 Claims. (Cl. 52—743)

This invention relates generally to improvements in the treatment and handling of granular insulating materials for use in cryogenic equipment and more particularly, relates to a novel portable system for continuously expanding perlite and the like and delivering said expanded materials directly into the insulation compartments of a storage tank for fluids and the site thereof. An ancillary purpose of the invention is to provide improved apparatus especially suitable for assembly thereof into a portable system for such continuous treatment and handling of perlite and like materials as an insulation fill.

Although the invention in its broad scope may be useful in connection with other granular insulating materials, it is especially useful in connection with the successful handling of intumescing materials such as perlite, vermiculite and the like for use as an insulation fill for storage tanks used to store gaseous fluids at extremes of temperature. Perlite is a siliceous material of volcanic origin containing small percentages of "combined water." When heated to its softening temperature range, the water vapor formed expands the perlite to produce a material of very low bulk density having a high insulating efficiency. Perlite is available in many different localities of the United States, for instance, and the perlite differs considerably, depending upon the locality in which it is found, as to the time required for expanding it and its temperature softening range. Such greatly expanded perlite is well known and used in many different ways.

Expanded perlite has been used as a dry granular insulating material in many fields, but recently it has been found advantageous as an inter-wall fill in cryogenic tanks, the latter being used to store liquids at temperatures substantially differing from ambient.

Prior to this invention, the procedures and techniques employed to prepare and deliver the expanded perlite in required quantities to the site of the storage tank and thereafter into the insulation compartments of the tank were laborious, costly and hazardous. To fully comprehend and appreciate the advance in the art contributed by the invention, a brief analysis of prior practices and techniques employed to accomplish this follows:

Initially, crude perlite, mined at the locality in which it was found, was shipped in bulk to a processing plant where it underwent special treatment to produce the expanded perlite aggregates in the various required specifications therefor depending upon its intended use. Typical processing equipment may include permanently installed, huge expander units properly anchored for mass production, feeding apparatus for supplying the crude perlite to the expander units, apparatus for delivery of the expanded perlite to grading bins, storage bins for cooling of the expanded perlite, etc., etc. The typical processing plant requires large amounts of floor space, substantial capital investment, maintenance and repair programs and the like. For use as an insulation fill, the practice has been to load the expanded perlite after proper cooling into paper bags or other inexpensive, disposable containers, and transport the loaded bags to the site of the tank usually remote from the processing plant. At the tank site, expensive crane equipment had to be provided to hoist the loaded bags of perlite to the top of the huge storage tank. The labor costs included those of filling the bags initially, loading the bags on the shipping carrier for transport to the site of the storage tank, unloading of the shipping carrier at the site and unloading the bags into the insulation compartments of the tank. Finally, the emptied bags or containers had to be removed and disposed of. It can be appreciated that many thousands of bags of perlite had to be handled in order to fill the insulation compartment of such a large storage tank. For instance, a conventional storage tank may require as much as 25,000 bags of perlite for insulation filling thereof. Since expanded perlite is approximately 10 to 20 times the original mineral in volume, it is obvious that the bulk handling of expanded perlite is a far greater problem than handling the unexpanded mineral.

In order to fill such insulation compartments properly, it was necessary to provide a large number of access openings ordinarily covered by manhole covers, and placed at selective locations around the perimeter of the tank and in the roof thereof through which the perlite could be poured after removal from the bags. In order to eliminate voids or gaps in the insulation fill, it was necessary to manually push and cram the perlite into the insulation compartment. Great care had to be exercised to avoid deposit of fragments of the bags into the insulation compartment, especially in the case of volatile and inflammable liquid and gas storage tanks.

Thus, the storage tanks had to be fabricated at substantially increased cost in order to provide a suitable number of access openings properly placed for proper insulation filling thereof by such previously used practices. In addition, this manner of insulation filling subjected the filling operations to the adverse effects of vicarious weather conditions where during periods of high winds, rain or snow, the filling operations had to be halted because entry of moisture and/or debris into the insulation compartment during filling of the tank was difficult to prevent. Also, it was very difficult to prevent absorption of moisture by the processed perlite during transporting thereof to the site of tank and unloading of the bags. Such absorption of moisture by the perlite or entry thereof into the insulation compartment had deleterious effects on the insulation efficiency of the perlite fill. Finally, tight scheduling of the entire insulation filling operation was required from the time of filling of the bags to the time of unloading thereof into the insulation compartment of the tank. In the event of schedule failures after shipment of the bagged perlite to the tank site, high demurrage costs resulted.

Accordingly, this invention has as the major objects thereof the provision of a novel system and apparatus for use in a continuous system for treating and handling perlite and the like as an insulation fill for large storage tanks which substantially eliminates all of the disadvantages hereinabove enumerated and enables unique and important additional benefits to be realized.

A primary object of the invention is to provide a portable system for treating and handling of perlite and like as an insulation fill for cryogenic equipment of the type described, said system including portable apparatus adapted to be assembled together for operation at the site of the said equipment and thereafter dismantled readily and conveniently.

Another object of the invention includes the provision of novel system of the character described which enables crude perlite to be processed continuously into expanded perlite at the site of storage tank and concurrently delivered into the insulation compartment of the tank, thereby eliminating the need for expensive facilities for loading, transporting and unloading bags of perlite, as heretofore required.

Another object of the invention is to provide a system of the character described which comprises portable apparatus adapted to be assembled and used at the site of a storage tank for insulation fill thereof, said system including novel means for conveying the expanded perlite into the insulation compartment of the tank in a continuous stream which enables the number of access openings into said compartment for proper and successful insulating filling thereof substantially and materially to be reduced with accompanying savings in the cost of fabrication of such tanks.

In connection with the preceding objects of the invention, it is necessary to understand that expanding crude perlite requires special equipment and technology. Because perlite found in different localities may vary considerably in the temperature softening range thereof, adequate equipment is required to handle satisfactorily all of the various kinds of perlite. The furnaces required must be able to generate and withstand the effects of very high temperatures and thereafter, cooling of the processed perlite is required. The conventional permanent processing plant has sufficient floor area and facilities for such successful treatment and handling of the perlite. The concept of successfully processing crude perlite by means of a portable system immediately adjacent the work site at which the perlite is to be used and delivering the processed perlite directly into the insulation compartments is contrary to the heretofore accepted technological practices and requirements in this field.

Another object of the invention is to provide a novel portable system of the character described which includes apparatus for expanding crude perlite at the tank site and delivering same into the insulation compartment of the tank, said apparatus including novel means for conveying hot processed perlite to an elevated location for feeding into said compartment while simultaneously cooling same, and novel means for feeding the cooled processed perlite into said compartment, said apparatus operating continuously and concurrently whereby large quantities of processed perlite can be supplied as insulation fill during relatively short periods of time.

Another object of the invention is to provide a novel portable system of the character described in which said conveying means includes gaseous fluid conduit means for transporting and cooling hot processed perlite concurrently and means for separating undesirable gaseous fluids from the perlite during selected stages of operation of the system.

Another object of the invention is to provide a portable system of the character described which includes a plurality of stages assembled together at the site of the storage tank to be insulation filled, said system including an expander stage for crude perlite and novel feeder means for supplying crude perlite to said expander at a continuous, rapid rate of speed and a gaseous fluid conveyor stage for transporting the processed perlite from the expander stage to the roof of the storage tank, said conveyor stage including a pressurized gaseous fluid conduit for cooling the processed perlite concurrently and means for separating the processed perlite from the said gaseous fluid prior to delivering same into the insulation compartment of the tank.

Another object of the invention is to provide in a system of the character described, novel apparatus for continuous loading of the processed perlite directly into the insulation compartment, said apparatus including means for separating the processed perlite from the gaseous fluid employed to transport same to said loading apparatus, a rotary air lock device and a collector device having a flexible fabric floor for deposition of the processed perlite thereon, means connected to said device including a flexible conduit for feeding the perlite from the device into the insulation compartment, means for supplying limited quantities of air to the conduit for transporting the perlite into the insulation compartment including pressure sensing means responsive to changes in pressure of the air in said conduit to measure levels of the perlite in said compartment.

Another object of the invention is to provide in a system of the character described, novel magnetic holding means for adjusting and holding the position of the discharge end of said conduit discharging perlite directly into the insulation compartment whereby a reduced number of access openings into said compartment are required and none are required around the perimeter of the tank.

Other objects of the invention will be seen to reside in the novel apparatus and equipment and combination thereof in a portable system of the character described whereby distinctive and important advantages are derived, including the economy and savings resulting from the successful operation of the system in close proximity to the work site, the elimination of bags for storage and transporting processed perlite, the elimination of hazards of adverse weather conditions arising at the work site, the prevention of undesirable debris and water vapor entering the insulation compartment, and the savings in time of operation and transportation costs.

The foregoing and other objects of the invention will become apparent as the description thereof evolves. A preferred embodiment of the said system, including the apparatus and equipment combined in said system, has been described in detail in the specification and illustrated in the accompanying drawing. It is contemplated that minor variations in the size, arrangement, proportion and construction of the several parts and apparatus thereof may occur to the skilled artisan without departing from the scope or sacrificing any of the advantages thereof.

In the drawings wherein the same characters of reference have been employed to designate the same or equivalent parts throughout the several figures thereof:

FIG. 1 is a diagrammatic view of the portable system embodying the invention for treating and handling perlite as an insulation fill for a storage tank.

FIG. 2 is a fragmentary diagrammatic view of said system showing the expander stage, the feeder means for supplying crude perlite to said expander stage and a portion of the gaseous fluid conveyor means for transporting and cooling the processed perlite from the expander stage to the insulation compartment of the storage tank, the feeder stage being sectioned to show details thereof.

FIG. 3 is a fragmentary sectional view taken longitudinally through the expander stage of the said system.

FIG. 4 is a medial sectional view taken through the apparatus for loading processed perlite into the insulation compartment of a storage tank, a portion of the tank being shown in fragmentary section in this view.

FIG. 5 is a fragmentary elevational view showing the conveyor means of the system connected to a gaseous fluid separator apparatus located astride the roof of the storage tank, and apparatus for discharging processed perlite into the insulation compartment, portions of the tank being broken away to show details.

FIG. 6 is a fragmentary sectional view taken through the roof of the storage tank to show details of the apparatus for discharging perlite into the said insulation compartment.

Referring to the drawings, in FIG. 1 the reference character 20 designates generally the novel portable system embodying the invention. System 20 is comprised of cooperatively assembled stages each of which includes certain apparatus and equipment advantageously connected together in a continuous line for processing, conveying and discharging granular insulating material such as expanded perlite to fill the insulation compartment of a conventional cryogenic storage tank 22 such as used for storing gaseous fluids at extremes of temperature. As seen in FIGS. 4 and 5, for instance, the storage tank 22 employs a double-walled construction which provides an insulation compartment 24 entirely around the circumference of the tank a portion 28 thereof is shown as and extending across the domed roof or top 26 of the tank. The roof 26 is dome-shaped in a conventional manner for such tank structures.

Prior to describing the individual and component stages of the system 20, the general operation of said system will be considered in connection with FIG. 1. The crude perlite or like intumescing material 30 is transported in bulk form to the installation site of the system 20 by means of a conventional carrier, such as the railroad box car 32 for which a track siding usually may be available or temporarily provided. Other types of carriers, such as trucks, may be employed, the mineral material 30 in crude form being transported directly to the site of the tank 22 from the locality in which it is mined. Certain intermediate steps of conventional processing and handling of such materials 30 are eliminated, such as shipment of the crude material to a conventional processing plant remote from tank 22, bagging or packaging of the processed material and trans-shipment and unloading of the thousands of bags of perlite required. Since there is no concern with moisture absorption by the crude material 30, ordinary box cars or trucks can be used to transport the crude ore to the tank site.

The crude ore 30 then can be removed from the car 32 manually as indicated at 34 or otherwise loaded into a truck or loading vehicle 36 from which it is thereafter transferred into a hopper or bin 38. The discharge end of the bin includes a continuous feeder device, for example, a screw feed 39 which feeds the crude ore 30 from the bin 38 into the lower end of an elevator 40. The elevator 40 lifts the material 30 and discharges the same at its upper end into a back pressure gate device 42 from which said material 30 then is discharged into the expander device 44 through a splitter device 46. On the interior of the expander 44, the crude ore 30 is subjected to required heating for expanding the same. The expanded perlite thereafter is blown upward, by means of the heated gases originating in the expander 44, through the conduit 48 into the collecting cyclone device 50 where it is separated from said hot gases, said gases being discharged through the stack 52 of said cyclone 50. The substantially gas-free expanded perlite is gravity-fed through the conduit 54 from the lower end of the cyclone 50 into the cooling and conveying conduit 56. At the juncture between the conduits 54 and 56 is a sampler valve 58 for diverting small amounts of expanded perlite to a discharge outlet 60 so that a quality test of a sample of the expanded material can be made.

The conduit 56 is connected at its bottom end to a blower 62 which pumps cooling air into the conduit 56 for the dual purpose of conveying the expanded perlite upwardly in said conduit 56 and concurrently cooling same. It may be noted that the valve 58 includes a variable outlet 63 which communicates with the ambient atmosphere for the purpose of preventing hot gases in the cyclone 50 from being sucked downwardly with the perlite into the conduit 56. A venturi throat 64 may be provided at the bottom end of the conduit 56 for creating a low pressure region at the juncture of said conduit 56 with the valve device 58 so that perlite will be sucked or drawn into said conduit 56.

The expanded perlite is conveyed upwardly in the conduit 56 with simultaneous cooling thereof to a separator cyclone 66 mounted on the roof 26 of the tank. The cyclone 66 separates the conveying fluid, which is air in this case, in the conduit 56 from the expanded perlite, said conveying fluid being discharged through the stack 68. The perlite in the cyclone 66 substantially free of said fluid then is gravity-fed to a collector and constant feed device 70 having a discharge end which is connected to a flexible conduit 72. The discharge end of the conduit 72 is inserted into the top portion 28 of the insulation compartment 24 of the tank 22 through an access opening 73. This phase of the system 20 will be described in detail subsequently. In order to prevent the adverse effects of inclement weather, the bin 38, elevator 40 and expander 44 with associated equipment are installed under a shelter, as indicated at 74. Further, the access opening 73 in the roof 26 of the tank through which the conduit 72 is inserted can be packed or shrouded as indicated at 75 in FIG. 4 to prevent entry of moisture or debris during filling of the insulation compartments.

The individual stages and apparatus thereof employed in the system 20 will be described in detail.

Referring to FIG. 2, the bin 38, feeder device 39, elevator 40 and the devices 42 and 46 connected together in sequence may be considered in consort as a feeder stage for the crude material 30. The lower end of the bin or hopper 30 is connected to an elongate housing in which a driven feeder screw or worm 76 is journalled with its axis of rotation horizontally arranged. The motor drive for the screw 76 is not illustrated because of the well known character thereof. The feeder worm 76 receives the material 30 from the bin and discharges the same into the lower end of the elevator 40 through the inlet trough 78. Screw feeder 76 is admirably suited for moving granular ore at a constant volume; however, where the material 30 is pulverulent, a suitable feeder device, such as a star wheel arrangement, may be substituted to assure constant volume feed of the ore 30.

The elevator 40 includes a vertically arranged housing 80 on the interior of which is a bucket conveyor for lifting the material 30 delivered through inlet trough 78 onto the bottom of the housing 80. Said conveyor means comprises a vertically arranged endless belt 82 supported by rollers 84 adjacent the top and bottom respectively of the housing 80. Either or both of said rollers 84 may be driven in a conventional manner. Regularly spaced along the reaches of the belt 82 and hinged thereto are buckets 86 which automatically fill themselves as the belt 82, moving in a counterclockwise direction, moves said buckets around the lower roller 84.

Adjacent the upper end of the elevator, the buckets 86 are emptied into a discharge outlet 88 communicating with the gate device 42. Said device 42 comprises a one-way valve which permits the ore 30 to enter the device 42 but prevents back-up of the ore into the elevator by reason of gas pressures in the expander 44. This is accomplished by the gate or flap 90 hingedly secured to a wall of the device 42 and spanning across outlets 88. At its bottom end, the device 42 has a splitter means which includes a pair of nipples, such as nipple 92 seen in FIG. 2, to each of which is secured a conduit 46. Referring to FIG. 3, the two conduits 46 are located on opposite sides of the expander 44 and the discharge ends 94 thereof are connected to inlet ducts 96 so that ore 30 from the device 42 can be discharged into the heating chamber 98 of the expander in two substantially equal streams from opposite sides of said chamber spaced apart approximately 180 degrees. Where there are means provided for supporting the hopper 38 and screw feed 39 at an elevated location, the elevator 40 may be eliminated and the feeder arranged to discharge directly into the valve 42.

The expander unit 44 may be of conventional, well known construction although miniaturized to suit the needs of system 20. The heating chamber 98 is suitably encased in an insulating housing 100. At its bottom end 101, the chamber 98 is tapered or funnel-shaped and a source of heat 102 is located therein. The source of heat 102 may comprise a suitable gas burner unit for heating the crude ore to its softening temperature for expanding the same. The crude ore is dropped into the frame of the burner unit from the splitter device where the water therein is vaporized and driven off as hot gases with the perlite being expanded in the process. The resulting hot gases from the expanded perlite rise rapidly and are sufficient to carry the very lightweight perlite upwardly through the conduit 48 into the collecting cyclone 50.

The collecting cyclone 50 is suitably supported in an elevated position braced from the shelter 74 by suitable brackets, such as bracket 104 seen in FIG. 1. Cyclone 50 is formed as a substantially conical housing having a funnel-shaped discharge end 106 communicating with the upper end 108 of the conduit 54. At its upper or opposite end is secured the stack 52 having suitable ports for permitting efflux of the hot gases carried into the cyclone 50 by the expanded perlite from the expander 44. The escape of hot gases from the chimney 52 is indicated by the arrows 110 and the remaining expanded perlite substantially free of hot gases is indicated by the broken arrows 112 in FIG. 2.

After separation of the hot gases from the expanded perlite in the cyclone 50, the perlite drops into the conduit 54 and thereafter, through the valve 58 in the connecting pipe 114 between conduit 54 and conduit 56. It may be pointed out that the location of the venturi throat 64 behind the discharge end of pipe 114 into conduit 56 creates a low pressure area thereat by reason of the air forced into the conduit 56 by the blower 62 which further assists in drawing the expanded perlite 112 into the conduit 56. The forced air feed from the blower 62 serves both as a gaseous fluid conveyor for the expanded perlite in conduit 56 as well as a cooling agent for lowering the temperature of the perlite during traversal of conduit 56. For purposes of description, the gaseous fluid blown into the conduit 56 by the blower 62 will be called "conveyor and cooling fluid" and is indicated by the arrows 116 in FIG. 2.

The conveyor and cooling fluid 116 carries the expanded perlite upwardly in conduit 56 and discharges same into the separator cyclone 66, as seen in FIG. 5. The cyclone 66 is similar in construction to the cyclone 50 and is mounted on the roof 26 of the tank supported in a suitable upright frame 118. The function of the cyclone 66 is to separate the expanded perlite from the conveyor and cooling fluid 116, said fluid 116 escaping through the stack 68. By the time the expanded perlite has traversed the conduit 56, it has been cooled sufficiently for subsequent loading into the insulation compartments of the tank.

Referring to FIG. 4, from the cyclone 66, the substantially gas-free expanded perlite is discharged into a collector and feed device designated generally 70. The device 70 includes a rotary air-lock comprising a vessel 122 having a plurality of blades 124 radially arranged and journalled therein for rotation with shaft 126. Each of said blades 124 has a flexible wiper member 128 which engages the inner curved surface of the vessel 122 to form an air seal therewith. At its bottom end, the vessel 122 communicates with the chamber 130 of a collector housing 132. The lower end 133 of the chamber normally is open and covered by a removable canvas sheet 134. Any other flexible foraminous member is suitable. The bottom edges of the housing 132 are outwardly flanged as indicated at 135 and a closure plate 136 having an orifice 138 therein is secured across said open end 133 by means of the channel-shaped clamps 140. The canvas sheet 134 is removably secured in position across said open end 133 between flanges 135 and closure plate 136 and the perlite from cyclone 66 is deposited thereon. A low pressure blower device 142 is connected by means of the conduit 75 144 to said orifice 138 so that clean air from the blower 142 can be circulated into the housing 132 for aerating the perlite on member 134 and then conveying same to the insulation compartments of the tank. The rotary airlock device prevents air from entering the housing 132 from blower 142 from escaping upwardly into the cyclone 66 which would reduce the collection efficiency of the cyclone. However, the aerating and conveying air from the blower 142 can circulate into the housing 132 through the textile material 134 as indicated by the arrows 146 in FIG. 4. Heavier, uncompletely expanded perlite or granular impurities may collect on the material 134 and these can be removed by removing the clamps 140.

In one side thereof, the collector housing 132 has a discharge nipple 150 to which is connected the inlet end of flexible hose 72. As seen in FIG. 4, the hose 72 is passed through the access opening 73 which comprises an ordinary manhole over which a manhole cover can be bolted. Such a covered access opening is illustrated at 152 in FIG. 1. In prior structures, several covered access openings were provided at various advantageous locations in the roof 26 of the tank. The need for such openings to fill both the top portion 28 and the circumferential portion of compartment 24 is eliminated by the invention, but such access openings are shown in the drawings. Obviously, tanks constructed with a plurality of openings 152 can be filled using the invention, and such openings may be useful for checking the insulation filling. According to the invention, however, only the top opening is needed. The length of hose 72 is sufficient to permit the discharge end 154 thereof to reach in close proximity to the point of juncture of the two compartments 24 and 28 with the hose disposed on the top wall 156 of the interior storage compartment 28 of the tank.

Further to be noted in FIG. 4 is the means employed for holding the discharge end 154 of the hose 72 in compartment 28 as the insulation filling thereof proceeds. Secured around the hose is a C-clamp or strap 160, the free ends of which are flanged and bolted together as seen at 162. On the strap 160 is secured a magnetic holding member 164 adapted magnetically to engage with the roof 26 on the inner surface thereof. Thus, the discharge end 154 of the hose 72 is supported in an elevated position relative to the wall 156 of the storage compartment. A more detailed view is shown in FIG. 6.

Further in FIG. 4 is illustrated a pressure gauge 168 having a conduit coupling 170 with the interior of vessel 122. The gauge 168 may comprise a simple manometer which is calibrated to measure differences in pressure on the interior of conduit 170 as the insulation compartments of the tank 22 are filled with perlite. Thus, after the expanded perlite enters the housing 132 and is deposited on the porous fabric bed 134, the stream of aerating fluid from the blower 142 aerates the expanded perlite, transports the same into the hose 72 and then, out through the discharge end 154 of said hose. As the level of perlite in the compartments 24 and portion 28 thereof rises sufficiently to engulf the discharge end 154, as seen in FIG. 4, the resulting back-pressure in the hose 72 will be transmitted through housing 132 and vessel 122 to conduit 170 so as to provide a reading on the gauge 168 which indicates that the discharge end 154 of the hose has been covered. The hose 72 then is moved to another position for filling another segment of the compartments. For this purpose, a man may crawl into the compartment 28 as seen in FIG. 4 to move the discharge end 154 of the hose 72 to another position in top portion 28 of compartment 24 by sliding the magnetic holding member 164 along the roof 26. Such movement of the discharge end of the hose may be necessitated several times. Further to be noted is the flexible covering or packing 75 through which the hose 72 is inserted for filling the circumferential portion of compartment 24 and top portion 28 as well. The covering 75 prevents entry of undesirable moisture and/or debris during insulation filling of the compartments.

In operation, the system continuously provides expanded perlite, as seen loaded into the insulation compartments at 175, at a rate of 400 to 600 cubic feet per hour and always protected from undesirable absorption of moisture from the ambient atmosphere. This compares favorably with the prior method in which the expanded perlite was fed from a storage hopper filled from bags. It is further apparent that by being able to pack or insulate the loading conduit 72 at the access opening 73 in which it is inserted, undesirable entry of debris and moisture into the insulation compartments also is avoided. The work of filling said compartments can continue even under adverse weather conditions because of the shelter 74 and protection provided for the access opening through which hose 72 is engaged. When one segment of the tank has been insulation filled, the conduit 72 is easily moved to another location until the filling is completed. This arrangement enables a substantial reduction in the number of access openings required for proper insulation filling of the tank.

The apparatus assembled together to form the system 20 is entirely portable. The various units thereof are built of suitable size to permit their ready assembly and dismantling and transportation to another tank site. As will be appreciated from the drawing, although not specifically described in detail, all connections can be separable so that the system can be dismantled readily.

It also is important to note the successful use of gaseous fluid for conveying and/or cooling the perlite after expansion thereof by recognizing that the low bulk density of the expanded perlite permits such conveying thereof. However, prior to insulation filling with the expanded perlite, the invention recognizes that such conveying and/or cooling fluids must be separated from the perlite to the extent that it will not interfere with proper insulation filling of the compartments. The inclusion of large quantities of undesirable gaseous fluids in the compartments would result in shrinking of the volume of space occupied by the expanded perlite in the compartments after a time, thereby reducing the insulation efficiency of the perlite.

In order to understand the nature of the invention, it might be of value to point out that the volume of the perlite after the expansion to the form it is used as insulation may be about twenty times its original volume. Each carload of ore 30, based upon maximum loading weight, after processing, may produce eight to ten times this volume of expanded perlite. The reduced number of carloadings using crude ore thereby can be appreciated. The storage tanks which are used as cryogenic equipments are ordinarily of dimensions of the order of 80 to 120 feet in diameter and about the same in height. The relative size of the equipment for expanding the perlite in situ and depositing same in the tank walls can be seen from these dimensions.

It is believed the invention has been described in sufficient detail to enable the skilled artisan to understand and practice the same to its best advantage. The invention has been defined in claims in language intended to be broadly construed commensurate with the degree of improvement over the prior art represented thereby.

What it is desired to secure by Letters Patent of the United States is:

1. A portable system adapted to be installed in proximity to a structure having an insulating space of relatively large volume therein, for filing said space with an intumesced material such as expanded mineral perlite, comprising thermal expansion apparatus arranged to receive ore of said mineral and subject the same to hot gases for expanding same into said intumesced material, said expansion apparatus having an outlet through while the intumesced material and hot gasses are exhausted, feed means supplying said ore to said expansion apparatus, a conveying conduit of sufficient length for reaching from the vicinity of said expansion apparatus to said insulating space, means supplying a gaseous fluid to said conduit to blow intumesced material through the conduit while simultaneously cooling the said material, means connected between said outlet and said conveying conduit for receiving the gases and intumesced material exhausted from said expansion apparatus, separating the same, and delivering the intumesced material substantially free of hot gases to said conveying conduit, and second separating means at the end of said conveying conduit for separating the gaseous fluid from the intumesced material and discharging the material into the said insulating space.

2. A system as claimed in claim 1 in which there is a mechanical feed device receiving the intumesced material from said second separating means at the end of said conveying conduit and a low pressure gaseous fluid operated distributor connected with said feed device and arranged to receive the material therefrom and transfer the same to any desired location within said space.

3. A system as claimed in claim 1 in which there is a mechanical feed device receiving the intumesced material from said second separating means at the end of said conveying conduit and a low pressure gaseous fluid operated distributor connected with said feed device and arranged to receive the material therefrom and transfer the same to any desired location within said space, and there being an air-lock between said distributor and said end of said conveying conduit to contain the pressure at the distributor.

4. A system as claimed in claim 1 in which means are provided to supply said ore to said expansion apparatus at substantially a constant rate whereby the process of expansion, transportation and distribution of said intumesced material into said space proceeds at substantially a constant rate.

5. A system as claimed in claim 1 in which said second separating means at the end of said conveying conduit comprises a cyclone device exhausting the gaseous fluid from the intumesced material and collecting said intumesced material, in which there is a low pressure gaseous fluid operated feed device receiving the collected intumesced material and a distributing conduit into which said feed device discharges, said conduit adapted to deliver the intumesced material to any desired locus of said space.

6. A system as claimed in claim 5 in which the feed device is air pressure operated and the intumesced material is forced through said distributing conduit and in which there is an air-locked transfer device between said feed device and cyclone device to prevent the back-up of air into said cyclone device from said feed device.

7. A system as claimed in claim 1 in which there is an elongate flexible conduit connected with said second separating means for receiving the intumesced material from the end of the conveying conduit and a low pressure air source connected to said flexible conduit for enabling distribution of the said material to any desired locus within said space.

8. A system as claimed in claim 1 in which means are provided for collecting the intumesced material after separation of the said gaseous fluid therefrom, in which there is a low pressure forced air feed device connected with the collecting means and the collecting means including an air-lock to contain the air pressure in said feed device.

9. A system as claimed in claim 8 in which there is an elongate flexible conduit extending from said feed device into said space and the intumesced material is forced through said conduit to any desired location within said space, in which there is a chamber formed in said feed device the pressure of which is substantially constant so long as material is flowing through said conduit but which increases in pressure in the event that the flow is opposed as by the level of intumesced material at said desired location rising above the discharge opening of the flexible conduit, and means are provided to detect the increase in pressure within said chamber as an indication of extent of fill.

10. A portable system for filling an insulating area with intumesced material comprising a mineral expander set up in situ and including a thermal expander, means for feeding unexpanded ore at a continuous rate to said thermal expander, first cyclone means receiving the intumesced material and hot gases from said expander and exhausting the gases while collecting the intumesced material, a conduit of sufficient length for reaching from the cyclone means to an entrance to said area and having a second cyclone means in association therewith adjacent said entrance, means for introducing the collected material from said first cyclone means into said conduit and means providing air pressure for blowing the material through the conduit to the second cyclone means while simultaneously cooling the same, said second cyclone means serving to separate the air from the material and collecting the intumesced material, low pressure operated feed means adapted to receive the separated intumesced material from the second cyclone means and discharge the same through said entrance into said area.

11. A system as claimed in claim 10 in which said conduit is provided with a low pressure creating section and the introducing means includes a connection to said section whereby the collected material will be drawn into said conduit.

12. A system as claimed in claim 10 in which the feed means comprises a rotary air-lock device receiving said intumesced material on one side thereof, a pressure chamber having air introduced at low pressure thereinto on the other side thereof, and a flexible conduit connected with said chamber and adapted to transport the intumesced material from said chamber by air pressure.

13. A system as claimed in claim 12 in which there is an air pressure measuring device connected with said chamber to ascertain whether the flow through said flexible conduit is blocked.

14. A method for insulating a storage tank or the like structure having an insulating compartment and an entrance to the compartment adjacent the top of the tank, which comprises the continuous steps of, thermally expanding mineral perlite ore in situ adjacent the tank, separating the hot gases from the expanded perlite and collecting the hot expanded perlite as a continuous stream, mixing the stream of hot perlite with cool air and transporting the mixture to the top of the tank by means of a blower, mixing the stream of the cooled expanded perlite with air under pressure at the top of the tank and directing the resulting mixture in a confined path to a desired location in said compartment through said entrance.

15. A method for insulating a storage tank or the like structure having an insulating compartment and an entrance to the compartment adjacent the top of the tank, which method comprises the continuous steps of, thermally expanding mineral perlite ore in situ adjacent the tank, separating the hot gases from the expanded perlite, mixing the hot expanded perlite with cool air under pressure and transporting said expanded perlite to the top of the tank by blowing the same in a confined path while in intimate association with said cool air, and separating the air used for transporting the expanded perlite from the expanded perlite when the air and perlite mixture reaches the top of the tank, thereafter mixing the thus separated cooled expanded perlite with air under pressure at the top of the tank and directing the resulting mixture in a confined path to a desired location in the insulating compartment through the entrance thereto.

16. In a system for expanding crude perlite and thereafter conveying the expanded perlite directly into the insulation compartment of a storage tank of the cryogenic type and the system is installed at the site of the tank, and includes an expander device for said perlite and means for feeding crude perlite into the expander at a substantially constant volume; a collecting cyclone device connected to said expander for receiving expanded perlite therefrom and separating therefrom the hot gases normally accompanying said expanded perlite, an elongate conduit connected at one end thereof to said cyclone device and of sufficient length to reach the opposite end thereof adjacent the roof of the tank, a second cyclone device supported on said roof and connected to said opposite end of the conduit, a blower device having a discharge outlet communicating with said conduit adjacent said one end thereof for discharging a cooling gaseous fluid into the conduit for transporting the expanded perlite from said first mentioned to said second mentioned cyclone while simultaneously cooling same, said second cyclone operative to separate said gaseous fluid from the perlite received therein, collector means connected to the discharge end of said second cyclone for deposition therein of said separated expanded perlite, and low pressurized gas conduit means for delivering said expanded perlite into the said compartment directly from the collector means.

17. In a system as described in claim 16 in which there is a rotary gas-lock device connected between said collecting means and second cyclone for preventing entry of said pressurized gas into the second cyclone from said collecting means.

18. In a system as described in claim 16 in which said gas conduit means includes a flexible hose having a discharge end and magnetic holding means supported on said discharge end for holding said discharge end removably engaged with an inside surface of said compartment during insulation filling of the compartment.

19. In a system as described in claim 16 in which there is a pressure gauge connected to said gas-lock device responsive to changes in pressure of the pressurized gas in said conduit means when said compartment has been filled to a predetermined level.

20. In a portable system for continuously expanding crude perlite and transporting the expanded perlite directly into the insulation compartment of a storage tank for gaseous fluids, and said system is installed for operation at the site of the tank; means for transporting the expanded perlite to the roof of the tank from a perlite expander installed at the foot of the tank comprising, a separator cyclone for separating hot gases from the expanded perlite discharged from the expander, a first conduit connected at one end thereof to said cyclone, a second conduit vertically arranged and having one end thereof capable of reaching to the roof of the tank, a pipe section interconnecting the opposite ends respectively of the conduits, and an air blower connected to said second conduit adjacent the said opposite end thereof for discharging pressurized air thereinto for conveying perlite to the roof of the tank while concurrently cooling same, and a second cyclone connected to the one end of the second conduit for separating said pressurized air from the perlite, said second cyclone arranged to be installed on the roof of the tank.

21. A system as claimed in claim 1 in which a feed means is disposed between the second separating means and the insulating space, said feed means comprising structure defining a chamber, means connected to said chamber for maintaining a constant pressure therein of a value slightly higher than atmospheric pressure during flow of expanded material from the second separating means, a rotary air-lock for introducing the expanded material into the chamber continuously without loss of pressure of the chamber, and a flexible discharge conduit connected with the chamber adapted to be inserted into the said entrance to any desired location in order to direct the discharge of expanded perlite into the compartment without fracture thereof.

22. A system as claimed in claim 21 in which there is a foraminous wall and the air is introduced into said chamber through said wall.

23. A system as claimed in claim 21 in which means are provided for measuring the said pressure whereby to detect any change thereof indicating a change in discharge conditions.

References Cited by the Examiner

UNITED STATES PATENTS

| | | | |
|---|---|---|---|
| 1,597,438 | 8/26 | Ennis | 302—64 X |
| 2,200,713 | 5/40 | Ericson et al. | 302—64 X |
| 2,431,884 | 12/47 | Neuschotz | 263—21 X |
| 2,532,351 | 12/50 | Wedebrock | 302—50 |
| 2,572,484 | 10/51 | Howle | 263—21 |
| 2,589,349 | 3/52 | Diefenbach. | |
| 2,807,453 | 9/57 | Pierce | 263—21 |
| 2,917,344 | 12/59 | Futty | 302—59 |
| 3,097,832 | 7/63 | Murdock et al. | 263—21 |

FOREIGN PATENTS 765,392  1/57  Great Britain.

FRANK L. ABBOTT, *Primary Examiner.*

JACOB L. NACKENOFF, *Examiner.*